United States Patent
Griffin et al.

(10) Patent No.: US 10,022,882 B2
(45) Date of Patent: Jul. 17, 2018

(54) SHAVING SYSTEMS

(71) Applicant: SHAVELOGIC, INC., Dallas, TX (US)

(72) Inventors: John W. Griffin, Moultonborough, NH (US); Craig A. Provost, Boston, MA (US); William E. Tucker, Attleboro, MA (US); Douglas R. Kohring, Arrowsic, ME (US)

(73) Assignee: SHAVELOGIC, INC., Dallas, TX (US)

( * ) Notice: Subject to any disclaimer, the term of this patent is extended or adjusted under 35 U.S.C. 154(b) by 0 days.

(21) Appl. No.: 15/447,497

(22) Filed: Mar. 2, 2017

(65) Prior Publication Data

US 2017/0173807 A1 Jun. 22, 2017

Related U.S. Application Data

(63) Continuation of application No. 13/802,614, filed on Mar. 13, 2013, now Pat. No. 9,623,575.

(60) Provisional application No. 61/738,857, filed on Dec. 18, 2012.

(51) Int. Cl.
*B26B 21/00* (2006.01)
*B26B 21/52* (2006.01)
*B26B 21/22* (2006.01)
*B26B 21/40* (2006.01)

(52) U.S. Cl.
CPC .......... *B26B 21/521* (2013.01); *B26B 21/225* (2013.01); *B26B 21/4081* (2013.01)

(58) Field of Classification Search
CPC ...... B26D 21/521; B26D 21/225; Y10T 83/04
USPC .................................. 83/13; 30/526, 527, 57
See application file for complete search history.

(56) References Cited

U.S. PATENT DOCUMENTS

| | | |
|---|---|---|
| 996,879 A | 7/1911 | Odell |
| 1,015,575 A | 1/1912 | Meyer |
| 1,074,615 A | 10/1913 | Folmer |
| 3,593,416 A | 7/1971 | Edson |
| 3,709,517 A | 1/1973 | Wossner |
| 3,768,348 A | 10/1973 | Braun et al. |
| 3,938,247 A | 2/1976 | Carbonell et al. |
| 5,466,901 A | 11/1995 | Mochizuki |
| 5,551,153 A | 9/1996 | Simms |

(Continued)

FOREIGN PATENT DOCUMENTS

| | | |
|---|---|---|
| EP | 1488894 | 12/2004 |
| EP | 2123410 | 11/2009 |

(Continued)

OTHER PUBLICATIONS

Search Report—Corresponding European Application No. 13864593, dated Jul. 19, 2016, 7 pages.

(Continued)

*Primary Examiner* — Omar Flores Sanchez
(74) *Attorney, Agent, or Firm* — Leber IP Law; Dennis R. Haszko

(57) ABSTRACT

Replaceable shaving assemblies are disclosed that include a blade unit, an interface element configured to removeably connect the blade unit to a handle, on which the blade unit is pivotably mounted, and an return element disposed between the blade unit and interface element. The return element serves as interface piece, connector and pivot all in one. Shaving systems including such shaving assemblies are also disclosed, as are methods of using such shaving systems.

20 Claims, 18 Drawing Sheets

(56) References Cited

U.S. PATENT DOCUMENTS

| | | |
|---|---|---|
| 5,551,717 A | 9/1996 | De Courcey Milne |
| 5,771,591 A | 6/1998 | Armbruster et al. |
| 5,855,071 A | 1/1999 | Apprille et al. |
| 7,802,368 B2 | 9/2010 | Coffin et al. |
| 8,499,459 B2 | 8/2013 | Efthimiadis et al. |
| 8,640,342 B2 | 2/2014 | Murgida |
| 8,732,955 B2 | 5/2014 | Howell et al. |
| 8,769,825 B2 | 7/2014 | Howell et al. |
| 8,789,282 B2 | 7/2014 | Wilson et al. |
| 8,793,880 B2 | 8/2014 | Taub et al. |
| 8,844,145 B2 | 9/2014 | Psimadas et al. |
| 9,902,077 B2 | 2/2018 | Park et al. |
| 2002/0059729 A1 | 5/2002 | Ikuta et al. |
| 2002/0138992 A1 | 10/2002 | Richard |
| 2002/0157255 A1 | 10/2002 | Coffin |
| 2003/0154603 A1 | 8/2003 | Guimont et al. |
| 2003/0200659 A1 | 10/2003 | Coffin et al. |
| 2003/0200660 A1 | 10/2003 | Pennella et al. |
| 2003/0205858 A1 | 11/2003 | Hall |
| 2004/0010918 A1 | 1/2004 | Orloff et al. |
| 2004/0177519 A1 | 9/2004 | Tomassetti et al. |
| 2005/0207837 A1 | 9/2005 | Kosh et al. |
| 2005/0278954 A1 | 12/2005 | Orloff et al. |
| 2006/0037197 A1 | 2/2006 | Hawes et al. |
| 2006/0080837 A1 | 4/2006 | Johnson et al. |
| 2006/0080838 A1 | 4/2006 | Johnson |
| 2006/0283025 A1 | 12/2006 | Folio et al. |
| 2007/0151106 A1 | 7/2007 | Steunenberg et al. |
| 2007/0204932 A1 | 9/2007 | Freed |
| 2007/0289139 A1 | 12/2007 | Peyser et al. |
| 2008/0155831 A1 | 7/2008 | Royle |
| 2008/0189964 A1 | 8/2008 | Bozikis |
| 2008/0196251 A1 | 8/2008 | Royle |
| 2009/0000126 A1 | 1/2009 | Kraus |
| 2009/0235539 A1 | 9/2009 | Wonderley |
| 2010/0011583 A1 | 1/2010 | Elfthimiadis et al. |
| 2010/0043242 A1 | 2/2010 | Stevens |
| 2010/0083505 A1 | 4/2010 | Royle et al. |
| 2011/0138586 A1 | 6/2011 | Gompert et al. |
| 2011/0192031 A1 | 8/2011 | Coresh |
| 2011/0247217 A1 | 10/2011 | Johnson et al. |
| 2012/0060382 A1 | 3/2012 | Beugels et al. |
| 2012/0073554 A1 | 3/2012 | Victor et al. |
| 2012/0124840 A1 | 5/2012 | Iaccarino et al. |
| 2012/0210586 A1 | 8/2012 | Lelieveld et al. |
| 2012/0297625 A1 | 11/2012 | Madden |
| 2013/0025578 A1 | 1/2013 | Jones |
| 2013/0081289 A1 | 4/2013 | Wain et al. |
| 2013/0174821 A1 | 7/2013 | Jones |
| 2014/0083265 A1 | 3/2014 | Provost et al. |
| 2014/0109735 A1 | 4/2014 | Shepperson |
| 2015/0158192 A1 | 6/2015 | Tucker |
| 2015/0174776 A1 | 6/2015 | Hawes |
| 2015/0190935 A1 | 7/2015 | Griffin |
| 2015/0190936 A1 | 7/2015 | Griffin |
| 2015/0290819 A1 | 10/2015 | Giannopoulos |
| 2015/0306777 A1 | 10/2015 | Georgakis |
| 2015/0314465 A1 | 11/2015 | Giannopoulos |
| 2015/0314466 A1 | 11/2015 | Papadopoulos-Papgeorgis |

FOREIGN PATENT DOCUMENTS

| | | |
|---|---|---|
| GB | 1460732 | 1/1977 |
| GB | 2030909 | 4/1980 |
| WO | 2012158143 | 11/2012 |
| WO | 2014051843 | 4/2014 |

OTHER PUBLICATIONS

Search Report—Corresponding European Application No. 13840539, dated Apr. 25, 2016, 7 pages.

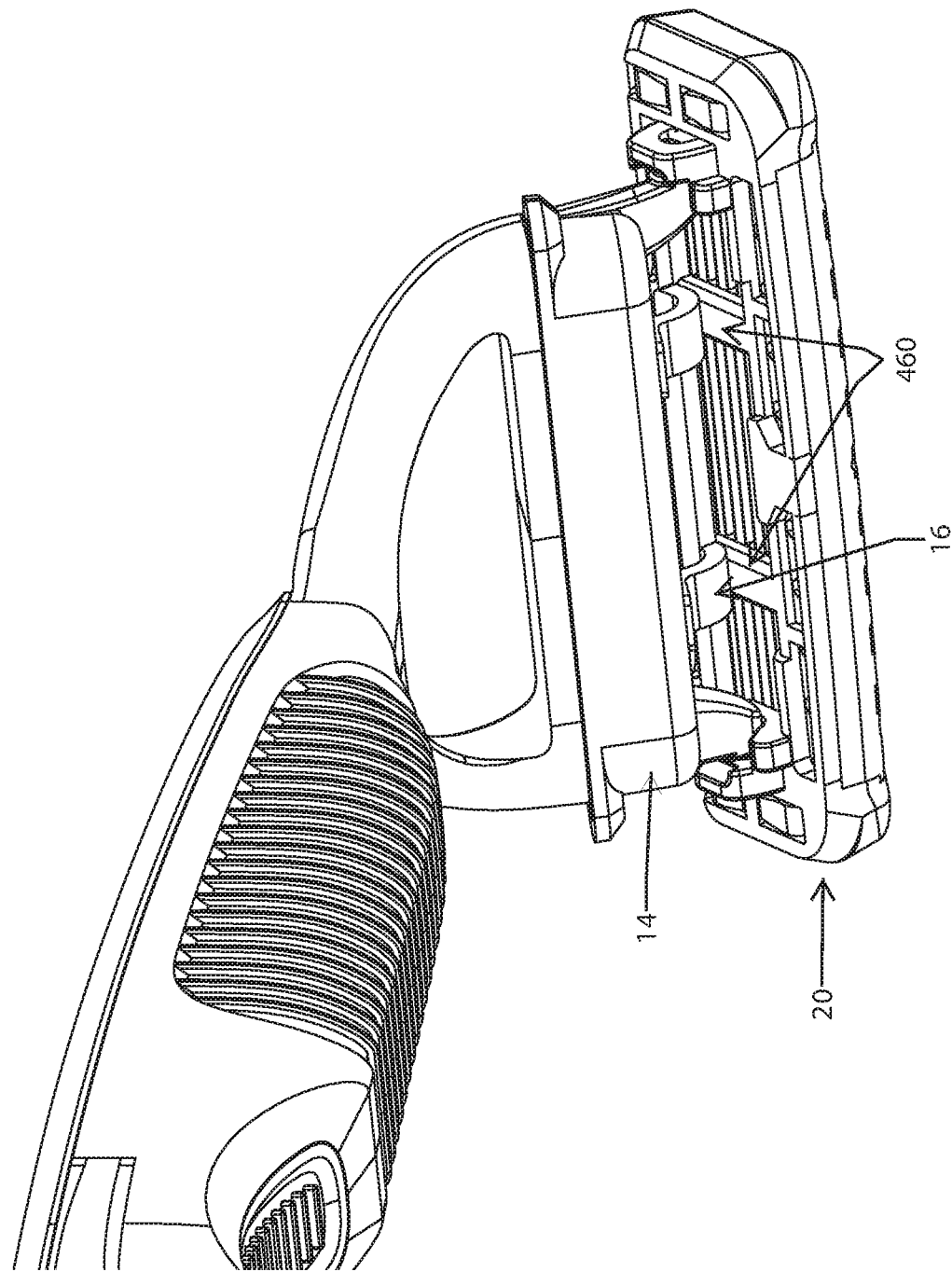

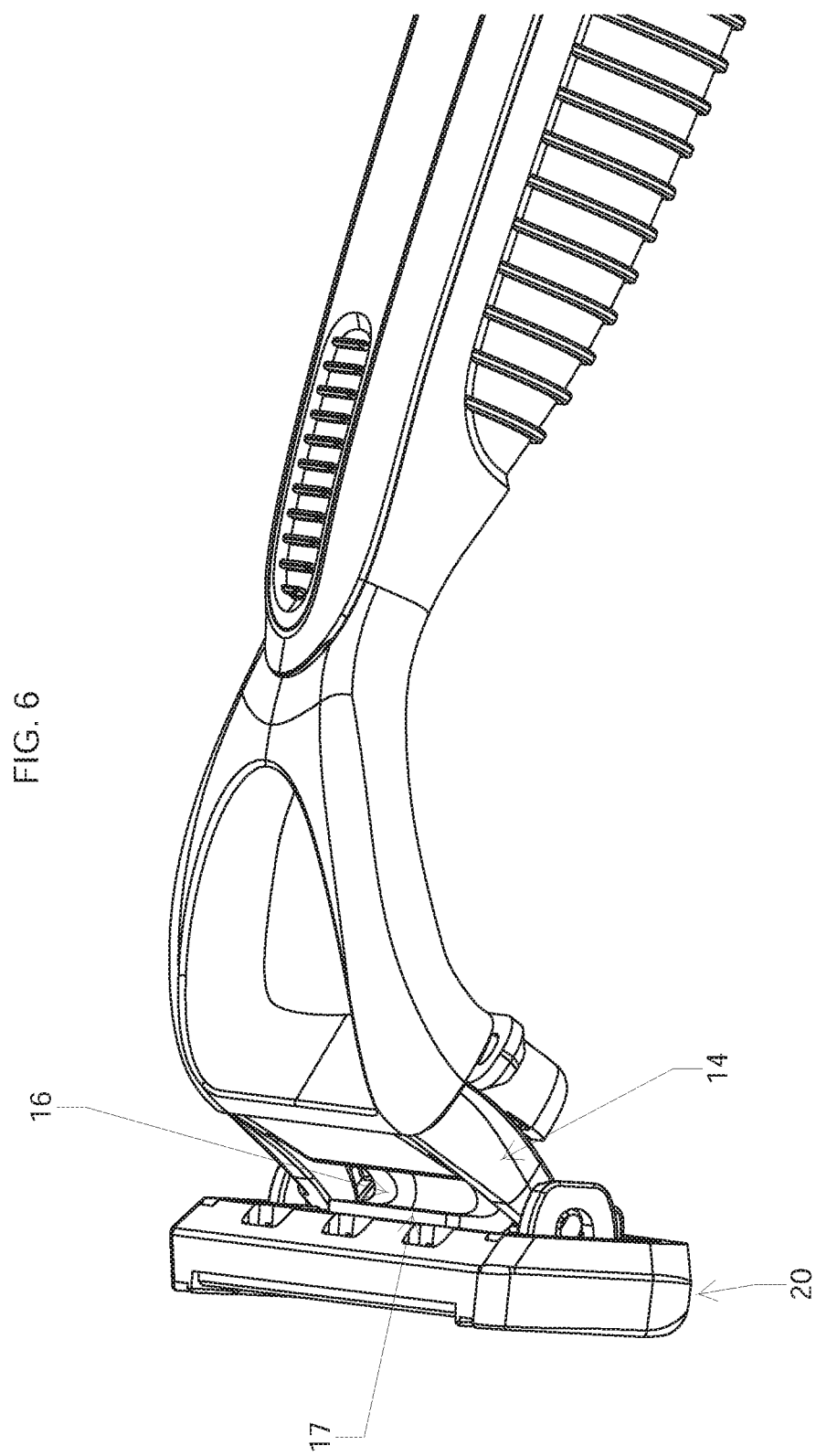

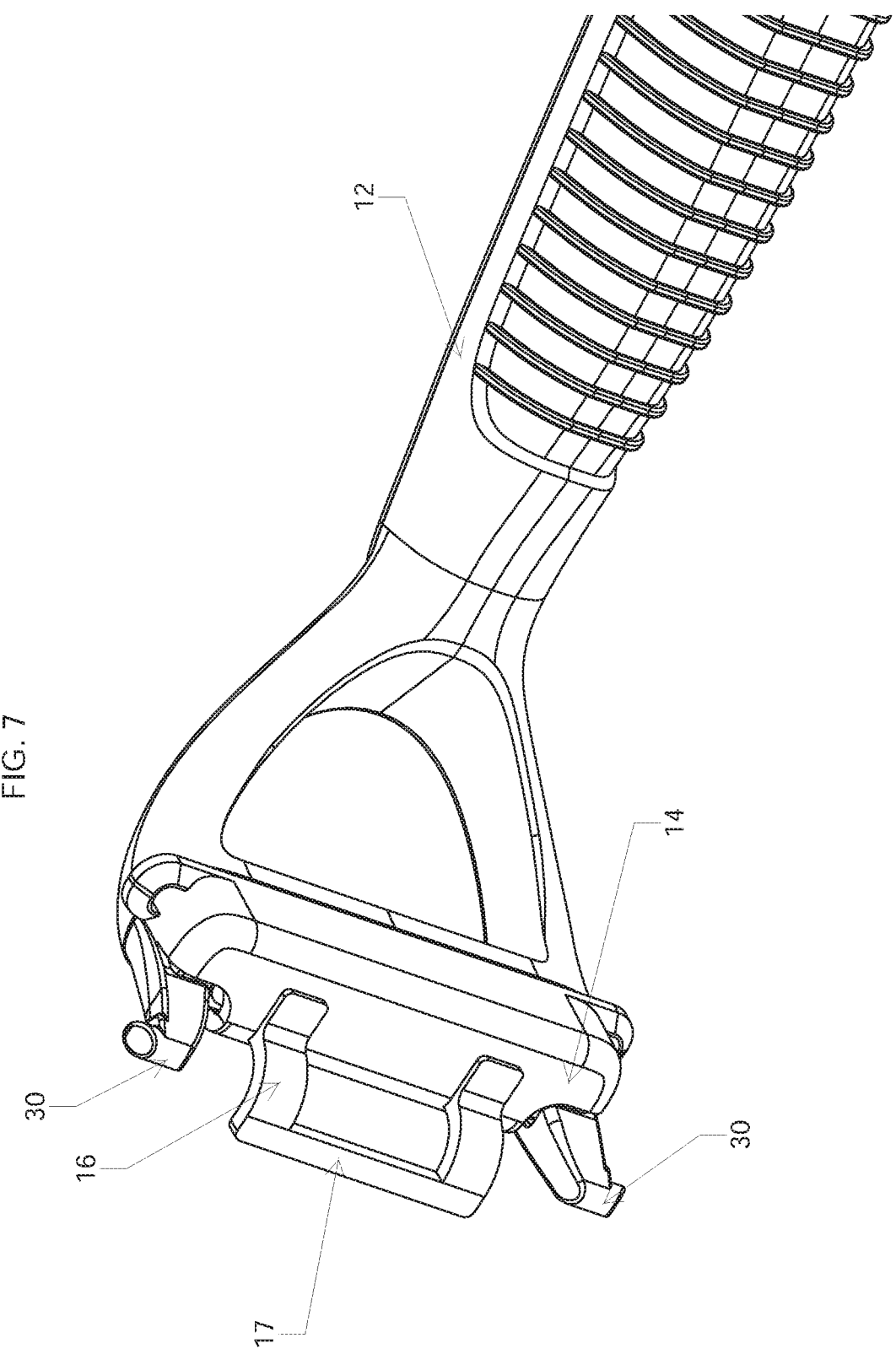

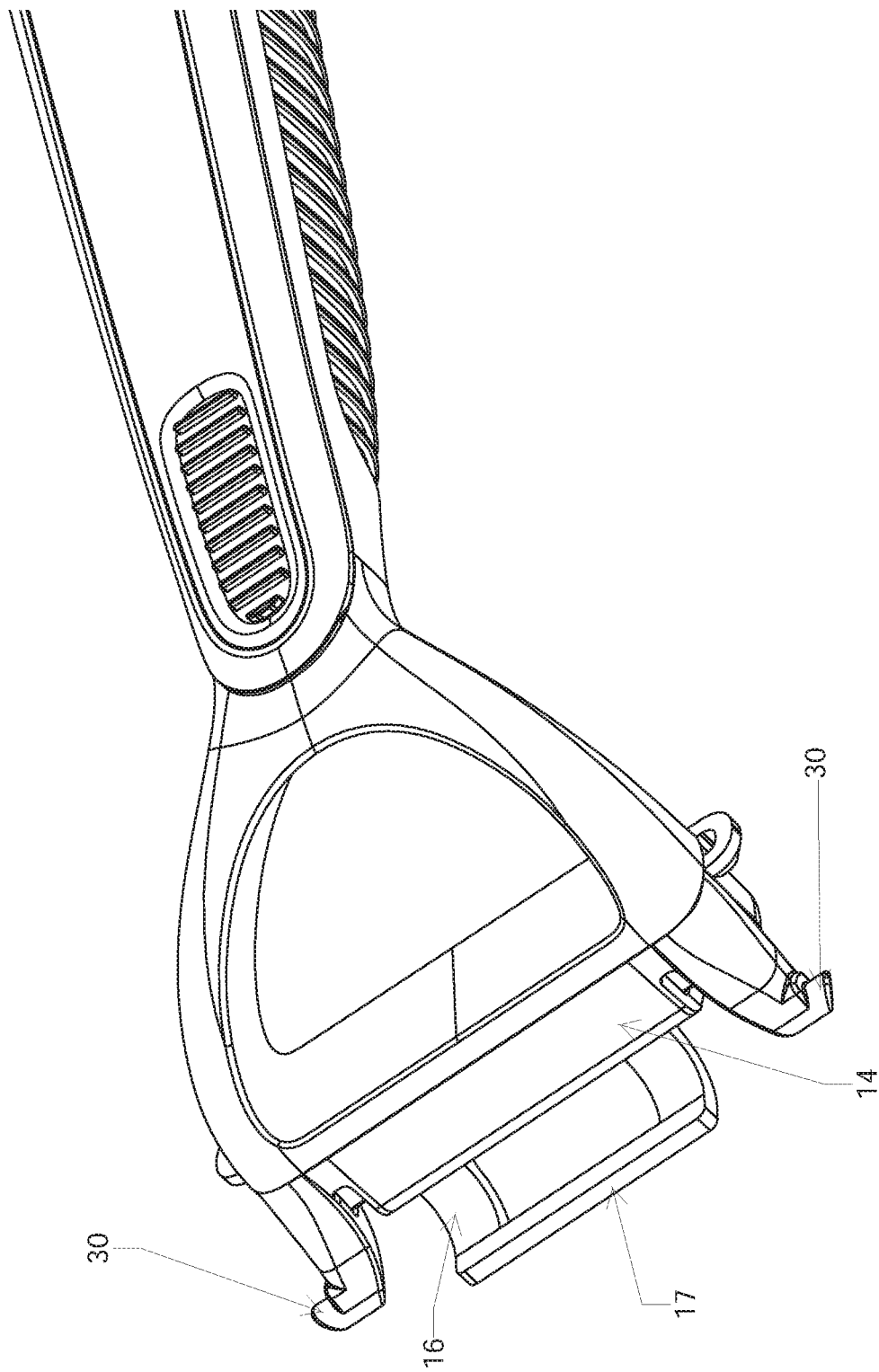

SHAVING SYSTEMS

RELATED APPLICATION

This application is a continuation application of U.S. patent application Ser. No. 13/802,614, filed Mar. 13, 2013, the entire contents of which is hereby incorporated by reference.

BACKGROUND

The invention relates to shaving systems having handles and replaceable blade units. Shaving systems often consist of a handle and a replaceable blade unit in which one or more blades are mounted in a plastic housing. After the blades in a blade unit have become dull from use, the blade unit is discarded and replaced on the handle with a new blade unit. Such systems often include a pivoting attachment between the blade unit and handle, which includes a pusher and follower configured to provide resistance during shaving and return the blade unit to a "rest" position when it is not in contact with the user's skin.

SUMMARY

In general, the present disclosure pertains to shaving systems and to replaceable shaving assemblies for use in such systems. The systems include a flexible return element, e.g., of an elastomeric material, which provides the resistance and return force that are often provided by a pusher and follower mechanism in prior art shaving systems.

In one aspect, the invention features a replaceable shaving assembly comprising (a) a blade unit and (b) an interface element configured to removeably connect the blade unit to a handle, the blade unit being pivotably mounted on the interface unit. The interface element comprises a flexible return element configured to provide a return force between the blade unit and handle.

Some implementations include one or more of the following features. The return element may be configured to bias the blade unit towards a rest position with respect to a pivot axis that is generally parallel to a long axis of the blade unit. The return element may be formed of or include a thermoplastic elastomer or thermoplastic urethane. The interface element may include a substantially rigid portion defining a cavity configured to receive a distal end of the handle. The return element may be molded onto or attached to the substantially rigid portion of the interface element. In some implementations the return element is generally U-shaped when viewed looking towards the back of the blade unit, in which case a base portion of the U-shape may be configured to engage a surface of the blade unit. The return element may be configured to bend or buckle upon rotation of the blade unit toward an upper surface of the handle.

In another aspect, the invention features a shaving system that includes (a) a handle having a distal end and a proximal end; and (b) a shaving assembly, mounted on the distal end of the handle, the shaving assembly including an interface element configured to connect the blade unit to the handle, and a blade unit that is pivotably mounted on the interface element. As in the first aspect, the interface element includes a flexible return element configured to provide a return force between the blade unit and handle.

Some implementations of this aspect of the invention may include any one or more of the features discussed above or elsewhere herein. In addition, in this aspect the shaving assembly may be either mounted removably on the handle, allowing it to be replaceable, or mounted fixedly to the handle. In the latter case, the shaving system would be designed to be disposable as a whole, rather than the shaving assembly being disposable and the handle being intended for long-term use.

In other aspects, the invention features methods of using the shaving systems disclosed herein. For example, the invention features a method of shaving comprising contacting the skin with the blade unit of a shaving system that includes (a) a handle having a distal end and a proximal end, and (b) pivotably mounted on the handle, a replaceable shaving assembly that includes a blade unit and an interface element configured to removeably connect the blade unit to the handle, the interface element comprising a flexible return element configured to provide a return force between the blade unit and handle.

DESCRIPTION OF THE DRAWINGS

FIGS. 5A and 5B show the same rotational position of the blade unit from a different viewpoint.

FIGS. 6 and 6A show the shaving assembly with the blade unit rotated further toward the upper part of the handle.

FIGS. 7 and 7A show the handle, interface element and return element with the blade unit removed for clarity.

DETAILED DESCRIPTION

Figure 1:
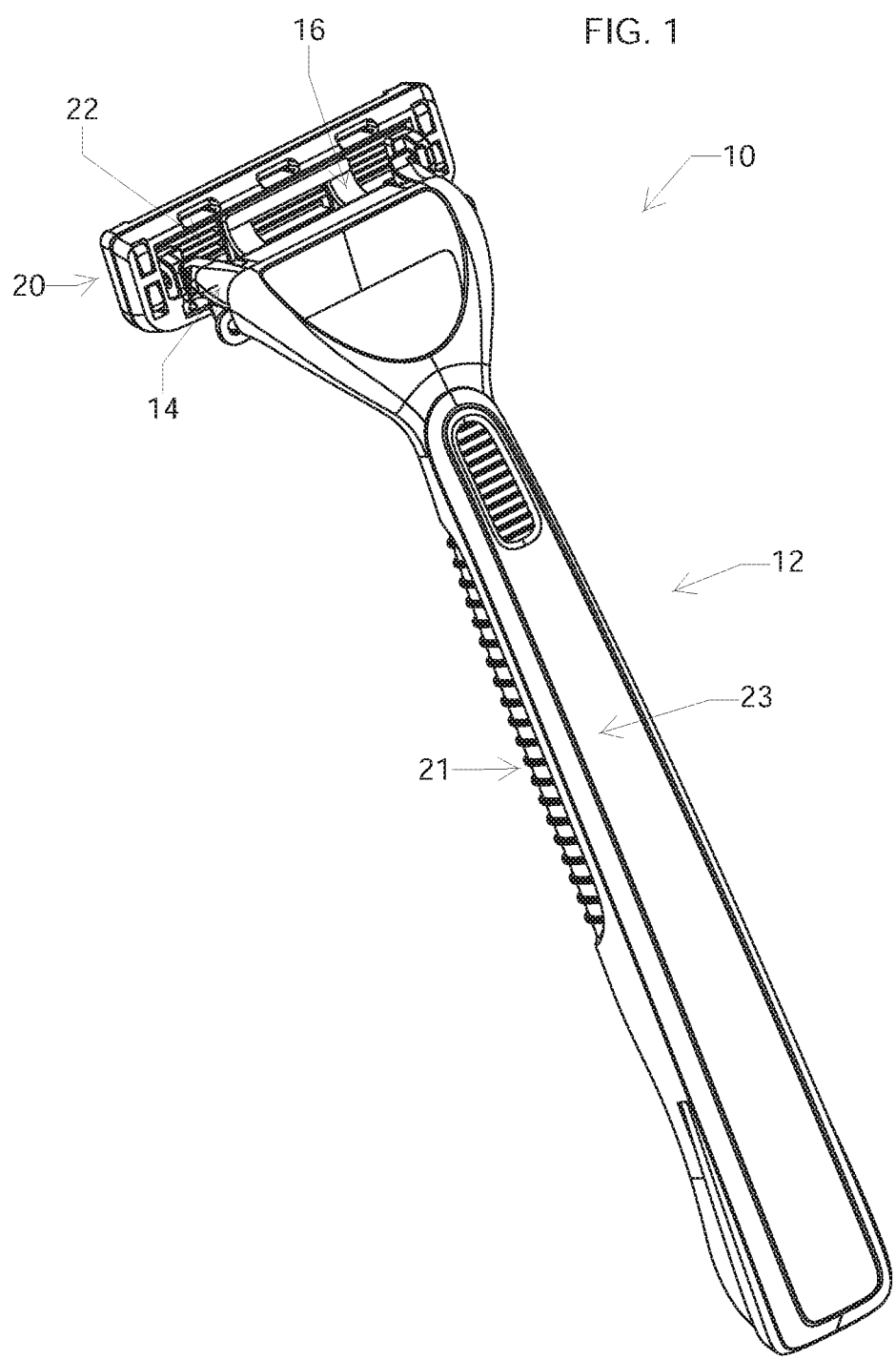
FIGS. 1-3 are perspective views of a shaving system according to one implementation, with the blade unit in various rotational positions.
Figure 2:
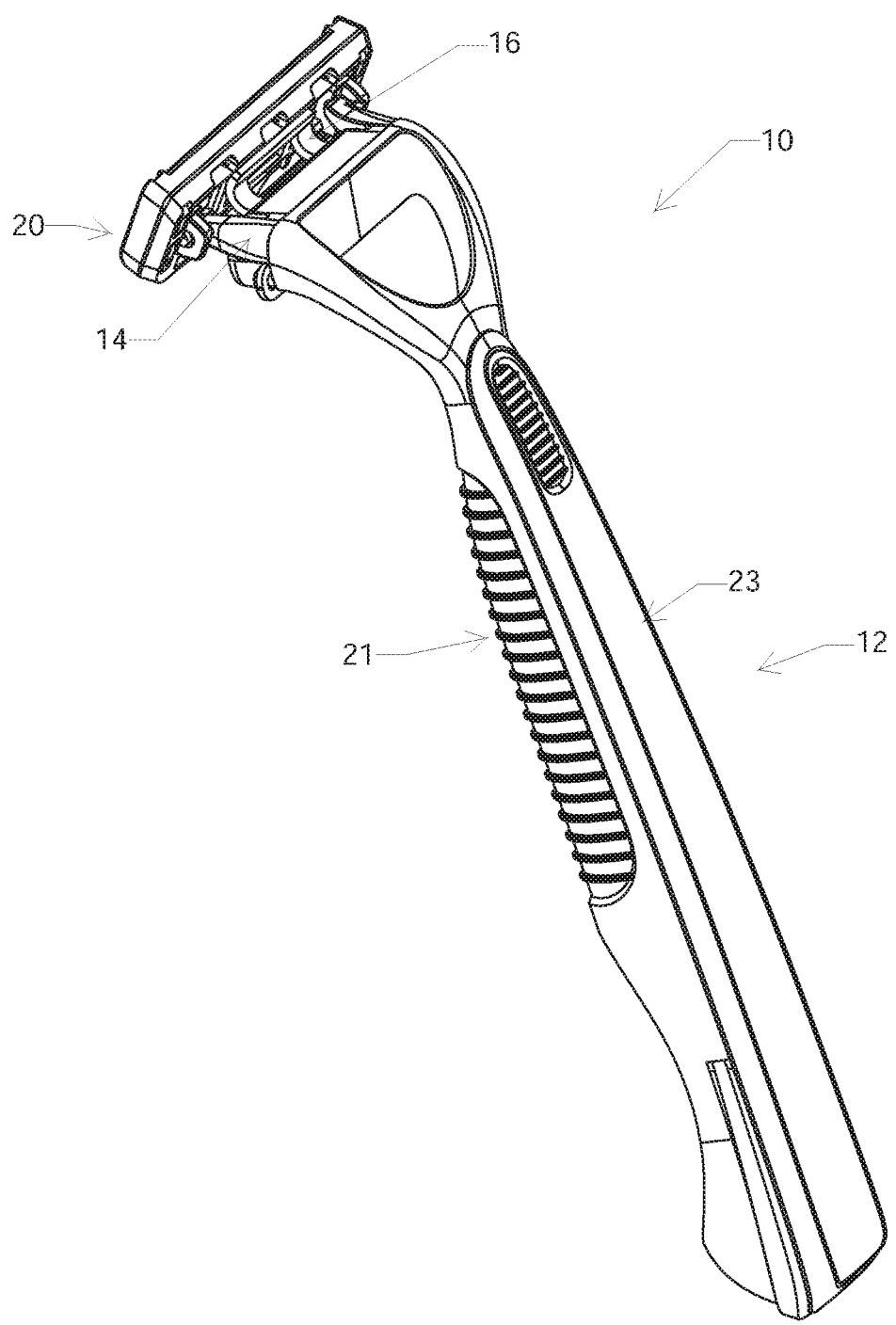
Figure 3:
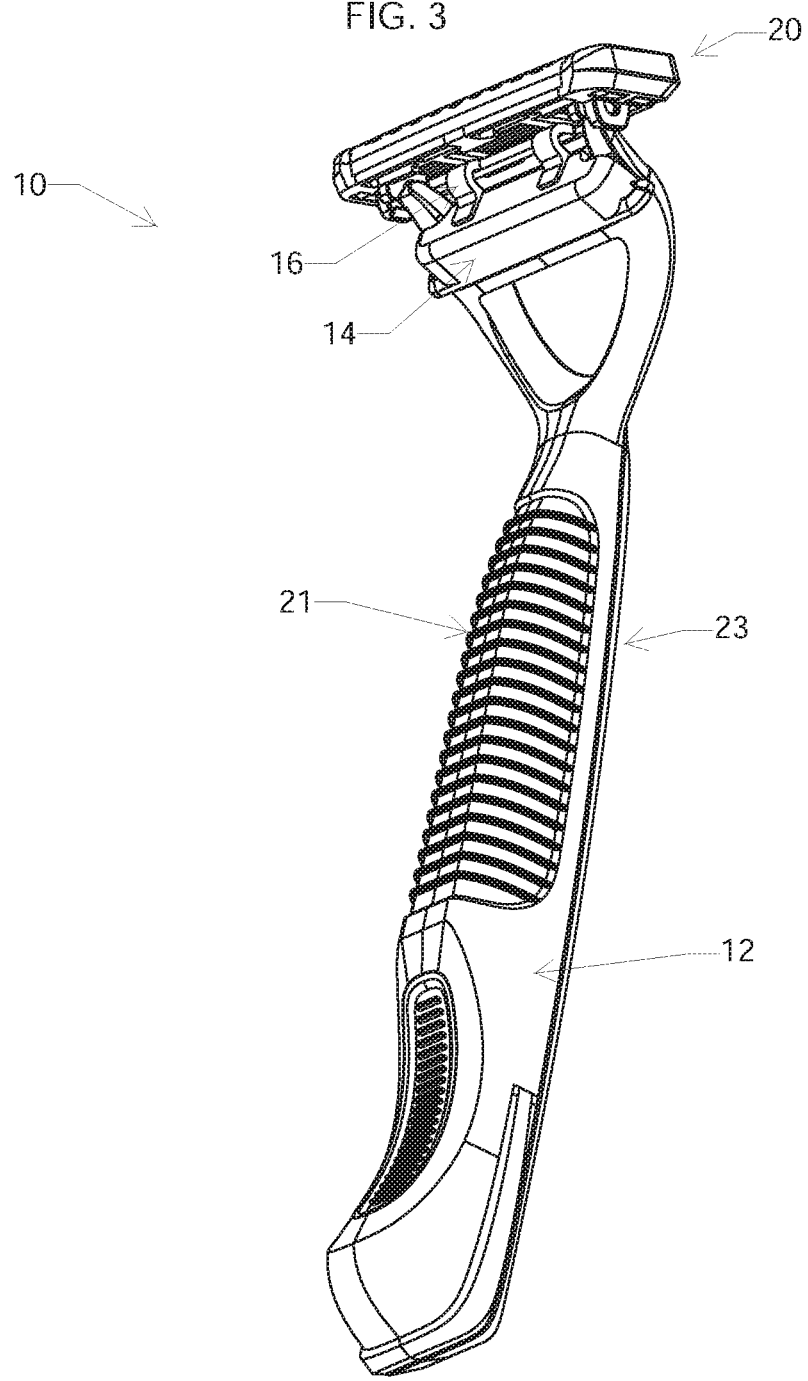

FIGS. 1-3 show a shaving system 10 that includes a handle 12, an interface element 14, a return element 16, and a blade unit 20 that includes a plurality of blades 22 (FIG. 1) and that is pivotably mounted on the interface element. The interface element includes a generally rigid body that defines a cavity (not shown) dimensioned to receive the distal end of handle 12. Generally, the interface element 14, the return element 16, and blade unit 20 are sold to the consumer as an integrated replaceable shaving assembly.

Figure 4:
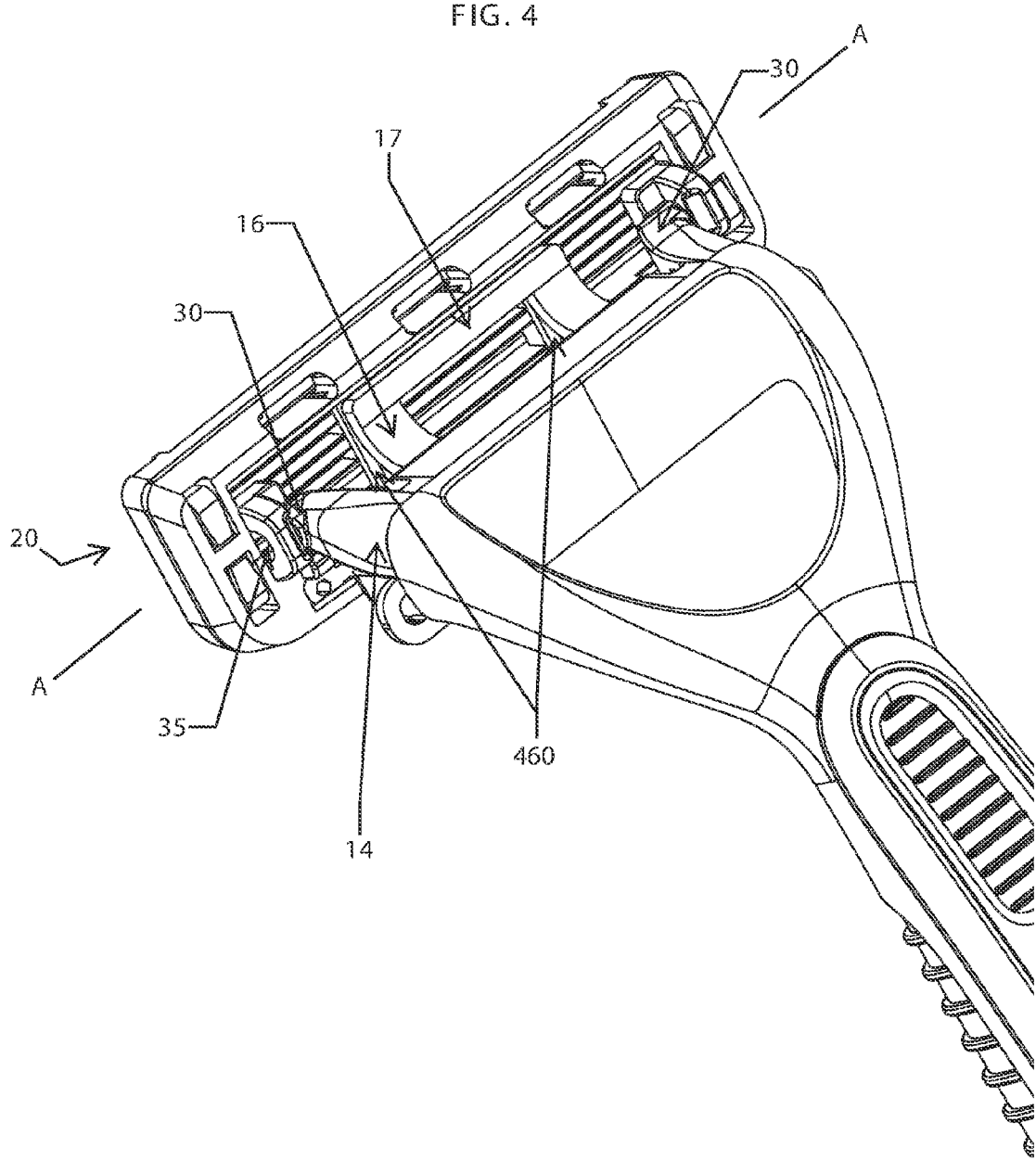
FIG. 4 is an enlarged perspective view of the shaving assembly and a portion of the handle of the shaving system shown in FIG. 1. The longitudinal axis (i.e., long axis) of the blade unit of the shaving system is indicated by line A-A.
Figure 5:
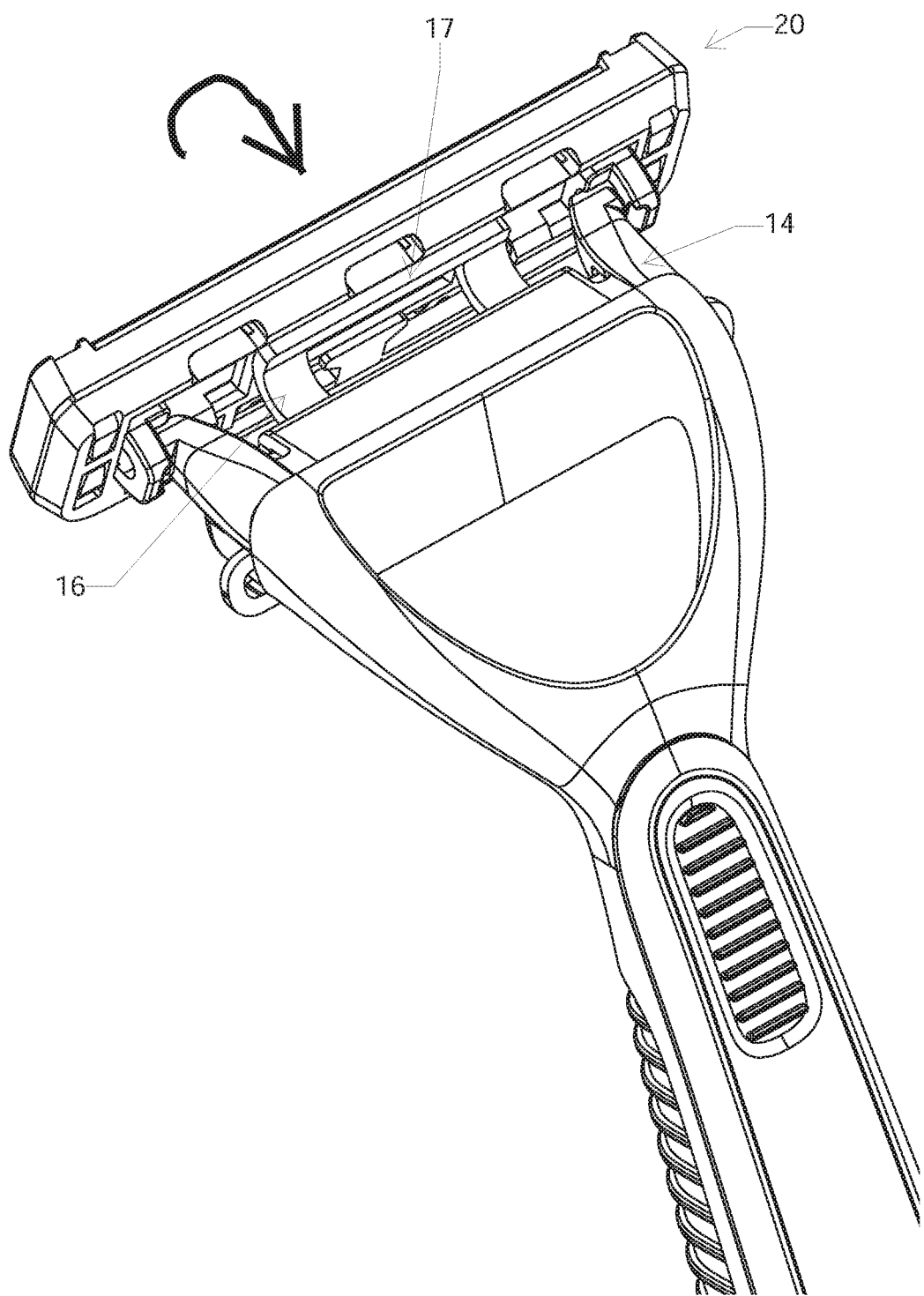
FIG. 5 is an enlarged perspective view similar to that of FIG. 4, showing the blade unit being rotated toward the upper part of the handle, as indicated by the arrow.
Figure 5A:
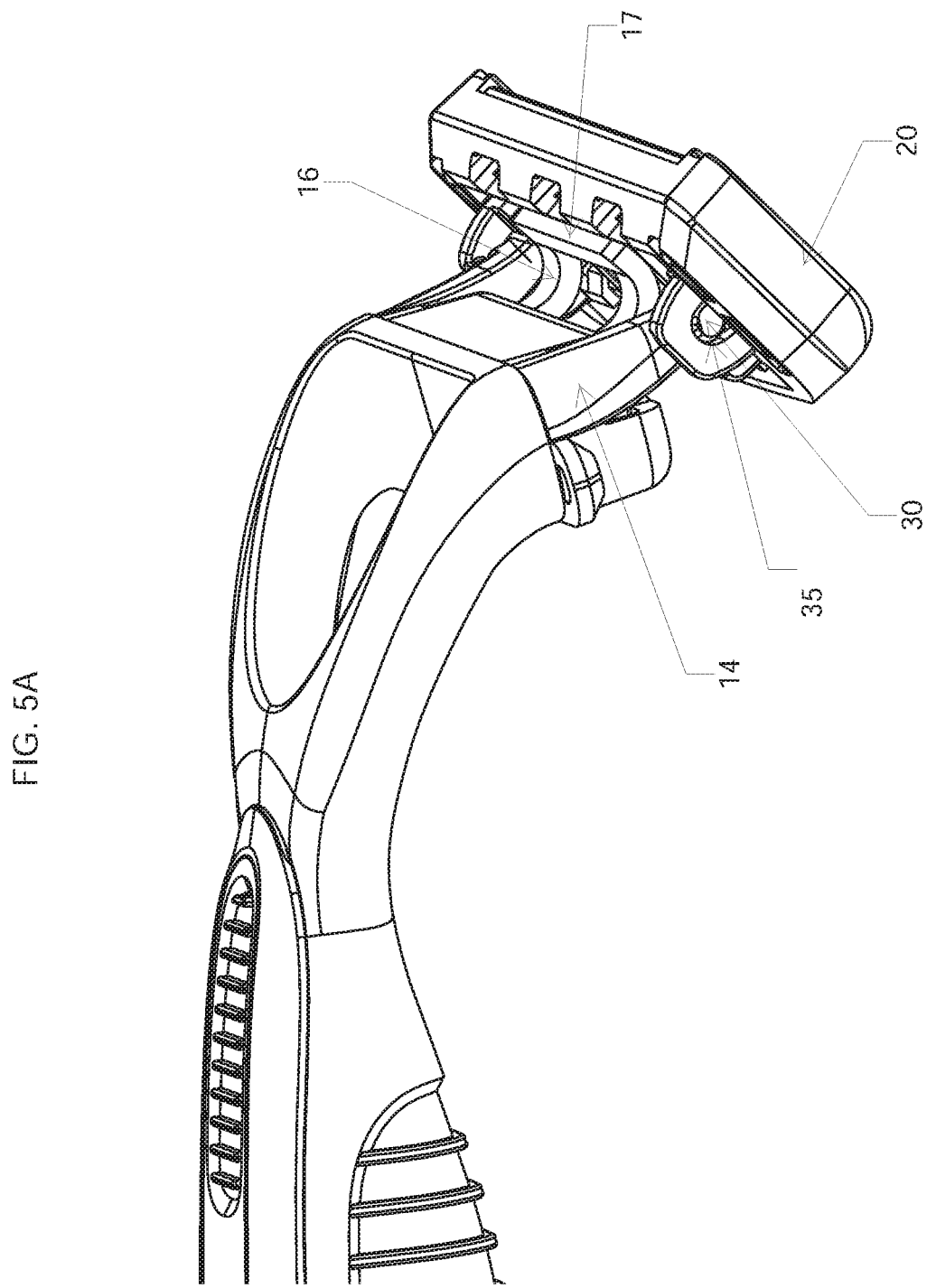
Figure 12:
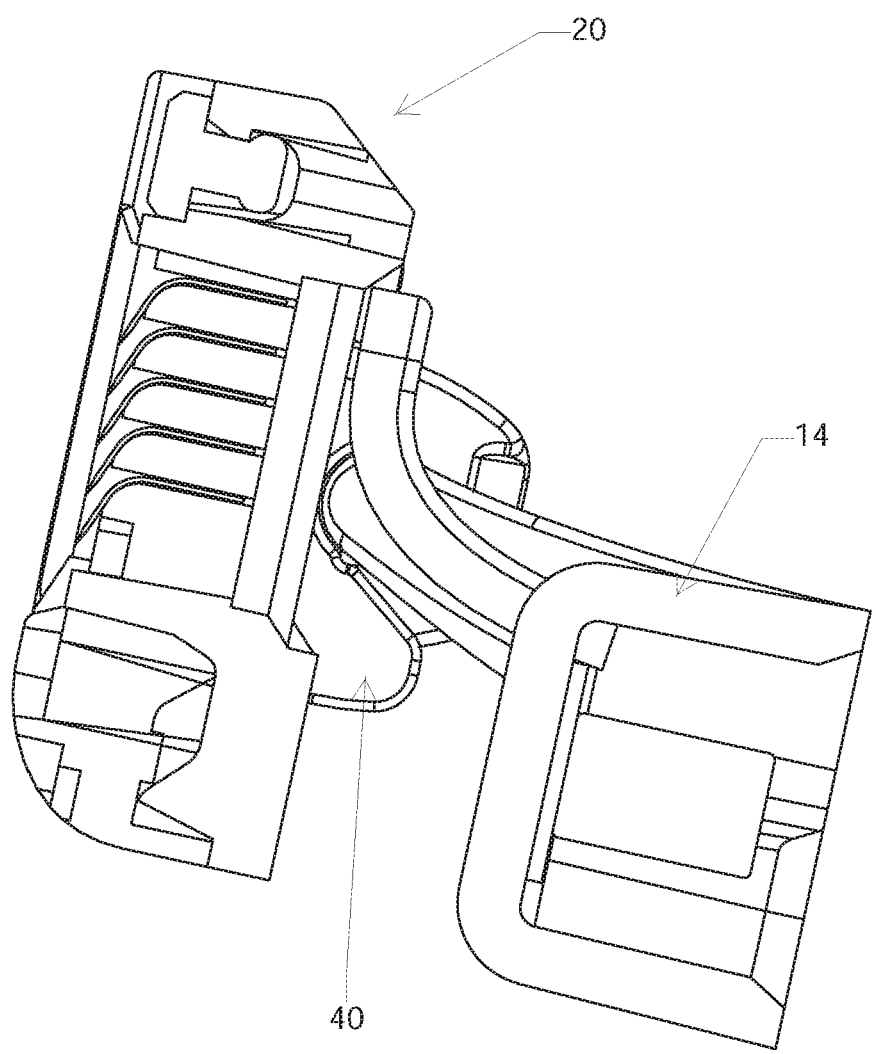
FIG. 12 is a diagrammatic side plan view showing an example of a pivot stop that may be used in the shaving systems disclosed herein.

Referring to FIG. 4, the blade unit 20 is mounted on interface element 14 by the positioning of a pair of fingers 30 (FIG. 7A) which extend from the interface element 14 into receiving bores 35 (FIGS. 5A, 5B) on the blade unit 20. The receiving bores 35 may be molded integrally with the blade unit 20. This attachment allows pivoting of the blade unit with respect to the interface unit and thus the handle. A blade unit pivot stop (e.g., a stop flange 40 as shown in FIG. 12) may be integrally formed with the blade unit 20 to limit the pivoting of the blade unit 20. Pivoting of the blade unit 20 is about an axis that is generally parallel to the long axis of the blade unit and is generally positioned to allow the blade unit 20 to follow the contours of a user's skin during shaving. Referring to FIGS. 8A-8D, preferably the angle of blade unit 20 with respect to handle 12 is about 15 degrees at rest, and the angle of the blade unit with respect to the skin surface can range from approximately 15° to 105° during shaving. The handle 12 provides a manner in which the shaving system can be manipulated and leverage can be applied to achieve desired shaving results.

The blade unit 20 is shown in three different rotational orientations in FIGS. 1-3. In FIG. 1, the blade unit is preloaded by the return element and is in an at rest position, pivoted slightly toward a bottom surface 21 of the handle; in FIG. 2, the blade unit is pivoted slightly toward a top surface 23 of the handle, and in FIG. 3 the blade unit is pivoted further toward the top surface 23. These positions are representative of the normal range of pivoting motion of the blade unit. As the blade unit pivots between these positions, the return element 16 flexes between an extended position (FIG. 1) and a bent position (FIG. 3), as will be discussed further below.

Figure 6A:
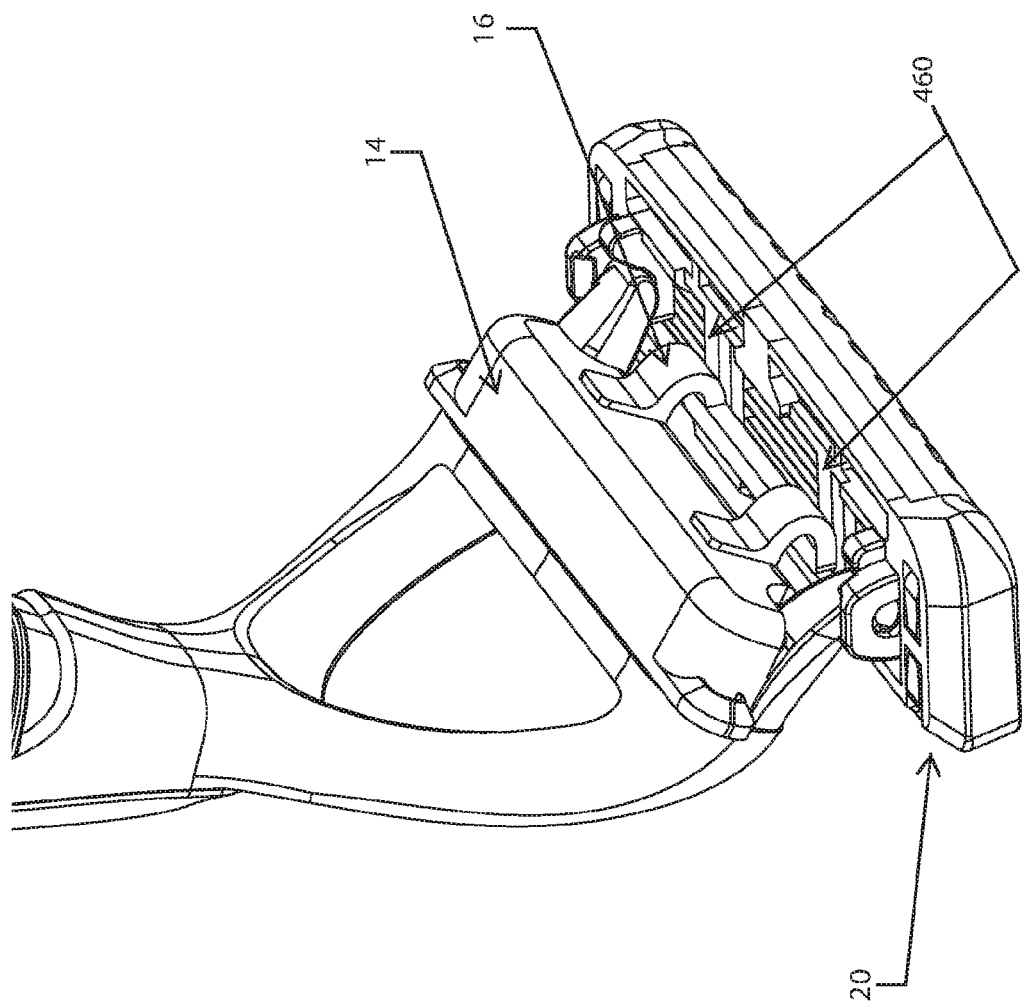
Figure 8A:
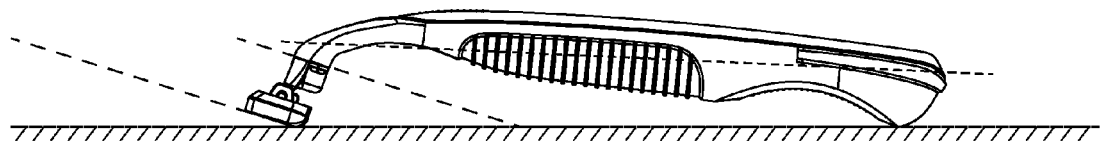
FIGS. 8A-8D are diagrammatic views illustrating how the angle of the blade unit with respect to the handle at rest, and to the skin surface during shaving, is measured.
Figure 8B:
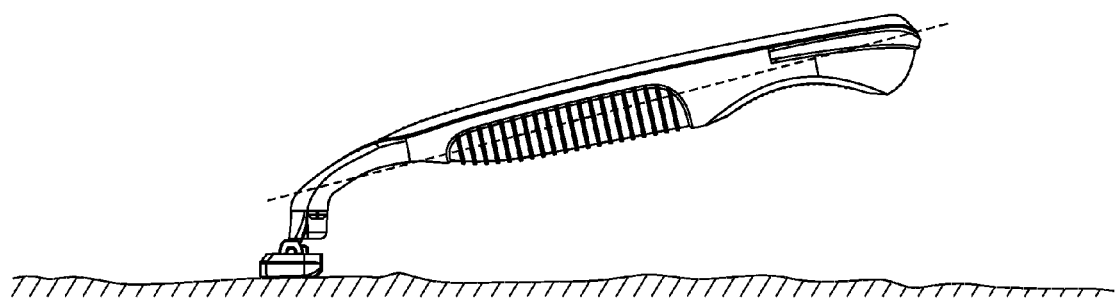
Figure 8C:
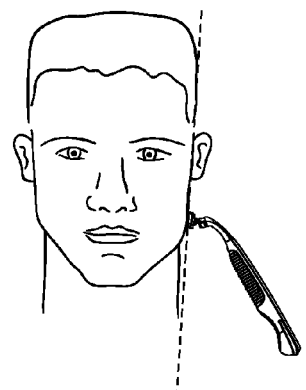
Figure 8D:
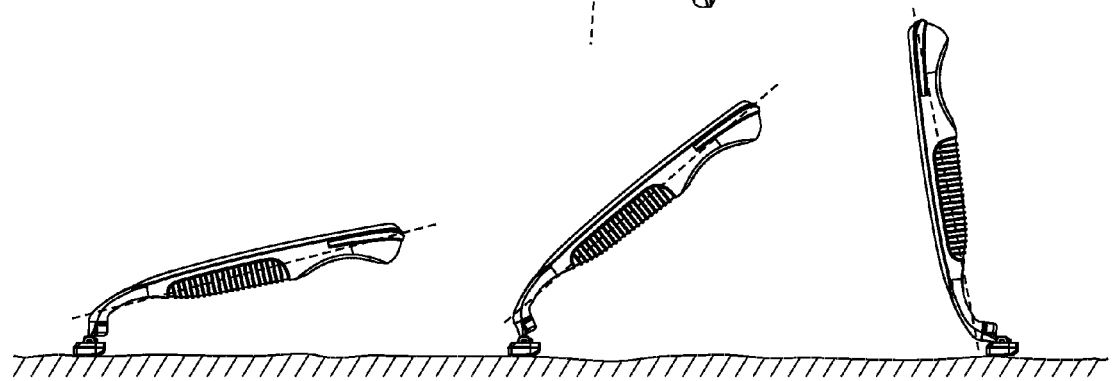

Referring to FIGS. 7 and 7A, the return element 16 is mounted on interface element 14 and extends generally downwardly and outwardly from the lower surface 15 of the interface element. The return element 16 is generally U-shaped, and includes a generally straight central portion 17 that is configured to engage the back surface at one or more support features 460 of the blade unit (e.g., as shown in FIG. 4, FIG. 5B, and FIG. 6A). The one or more support features 460 are positioned to act as a stop for the distal end of the return element.

As shown in detail in FIGS. 4-6A, as the blade unit pivots toward the upper surface of the handle, the return element 16 deforms more and more, until it finally reaches the bent position shown in FIGS. 6 and 6A. As it deforms, the return element 16 provides resistance during shaving, limiting the free pivoting of the blade unit about the pivot axis described above. In addition, the return element 16 provides a return force that biases the blade unit 16 towards its rest position, in the same manner that resistance and return force are typically provided by a pusher/follower assembly.

The return element 16 may be integrally molded with the interface element 14, e.g., by co-molding the elastomer with the rigid plastic used to form the body of the interface element. It is noted that the term "co-molding," as used herein, includes transfer molding, multi-material molding, and other techniques suitable for molding two or more different materials into a single part.

The return element 16 can be formed, for example, from synthetic or natural rubber materials. Suitable materials are well known in the shaving system art, and include thermoplastic elastomers, for example, polyether-based thermoplastic elastomers (TPEs) available from Kraiburg HTP, thermoplastic urethanes (TPUs), silicones, polyether-based thermoplastic vulcanizate elastomer (TPVs) available from Exxon Mobil Corporation under the tradename Santoprene™. The elastomeric material is selected to provide a desired degree of restoring force and durability. In some implementations, the elastomer has a Durometer of less than about 45 Shore A, e.g., from about 20 to 90 Shore A.

The return element 16 is designed such that its geometry provides an applied load as assembled that is sufficient to return the blade unit to its home position, e.g., against the stop on the interface element (e.g., the stop flange 40 shown in FIG. 12), when not in use, for example, when the handle is being held without any load on the blade unit. Preferably the pretensioned load is typically at least 5 grams, e.g., 5 to 50 grams, and the load during shaving is from about 5 to 100 grams.

The handle 12 provides a manner in which the shaving system can be manipulated and leverage can be applied to achieve desired shaving results. Preferably, the handle 12 is designed to be connected to the interface element 14 so as to allow for easy removal and attachment. This could be accomplished in a number of manners, such as a mechanical locking mechanism, magnetic interaction, etc. For example, the handle interface element 14 and handle 12 can interface in the manner discussed in U.S. Ser. No. 61/651,732, filed May 25, 2012, and U.S. Ser. No. 13/802,546, filed Mar. 13, 2013, the full disclosures of which are incorporated herein by reference. Also, while the interface element is shown as a female element and the handle as a male element, the opposite configuration may be used if desired.

The hard portions of handle 12, the housing of blade unit 20, and the interface element 14 can be made of any suitable material including, for example, metal, acetal (POM), acrylonitrile butadiene styrene (ABS), polyethylene terephthalate (PET or PETE), high density (HD) PETE, thermoplastic polymer, polypropylene, oriented polypropylene, polyurethane, polyvinyl chloride (PVC), polytetrafluoroethylene (PTFE), polyester, high-gloss polyester, nylon, or any combination thereof.

A number of embodiments have been described. Nevertheless, it will be understood that various modifications may be made without departing from the spirit and scope of the disclosure.

Figure 9:
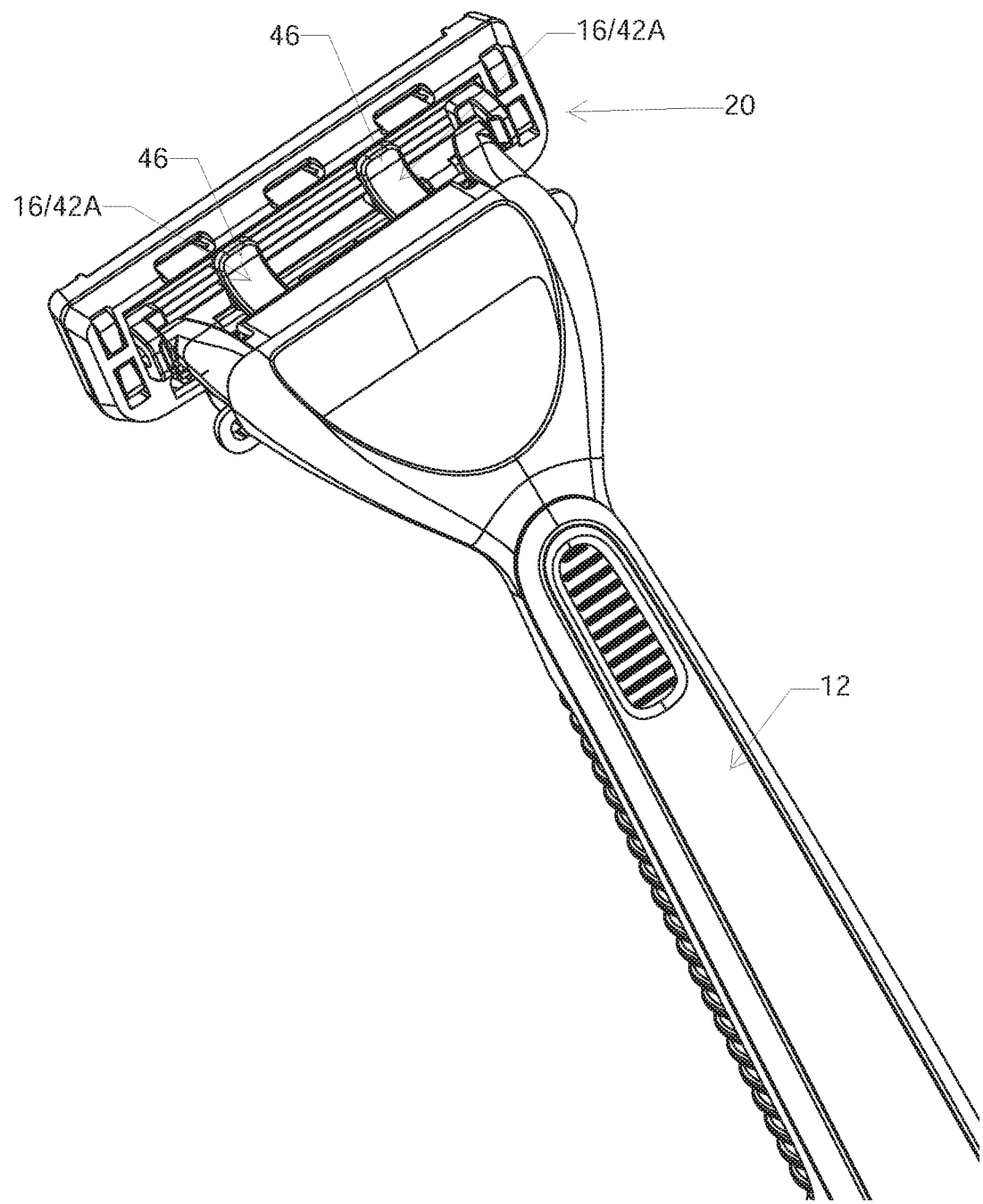
FIGS. 9 and 10 are perspective views of shaving systems according to alternate embodiments.
Figure 10:
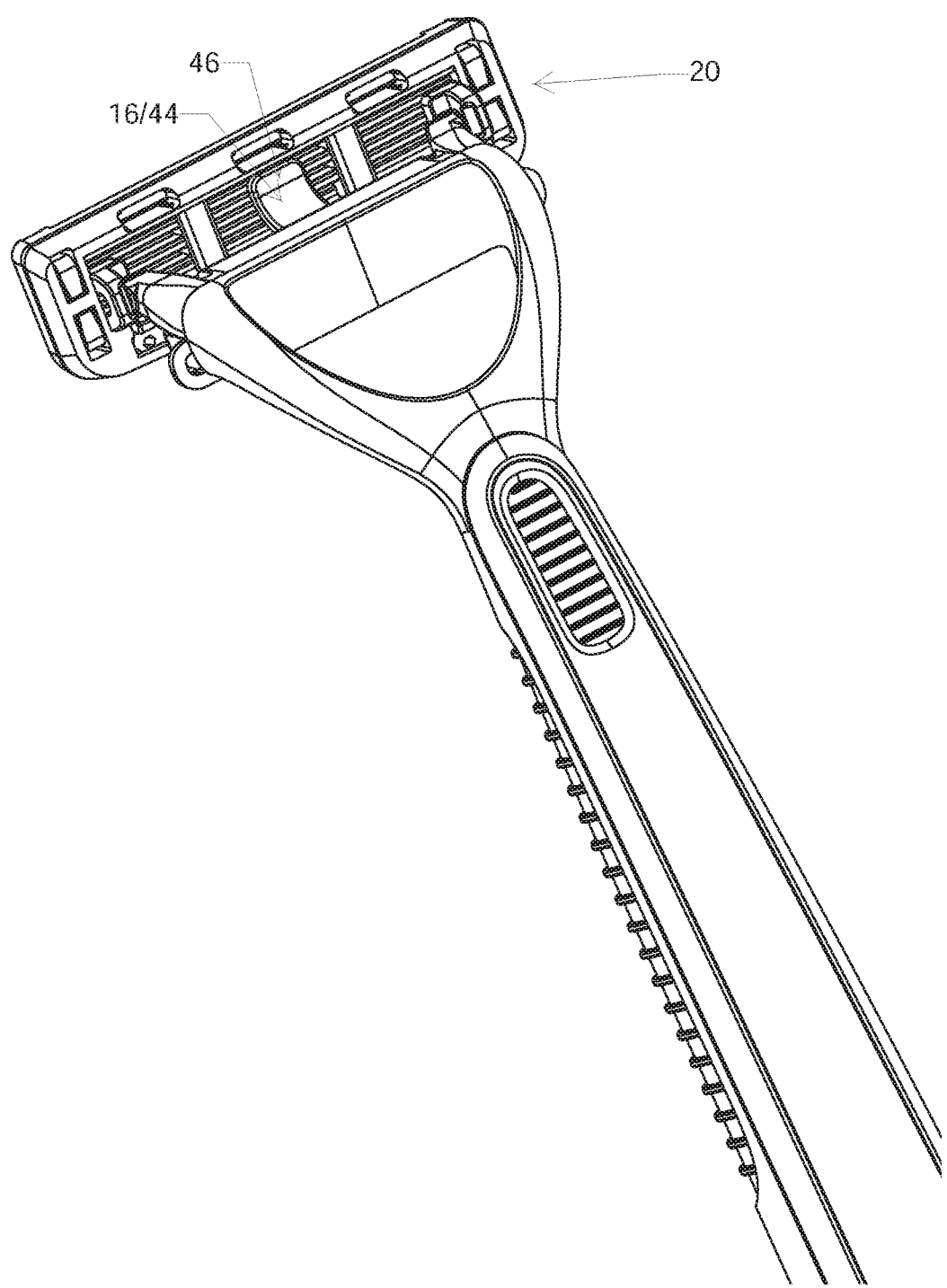
Figure 11A:
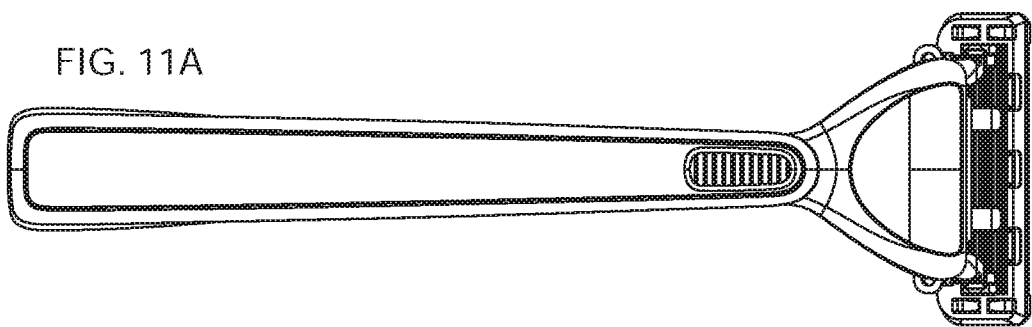
FIGS. 11A-11C are rear plan views of the shaving systems shown in FIGS. 9, 1 and 10, respectively.
Figure 11B:
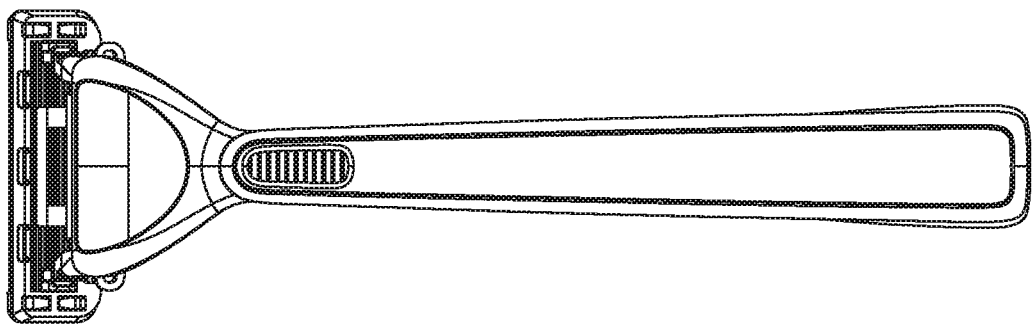
Figure 11C:
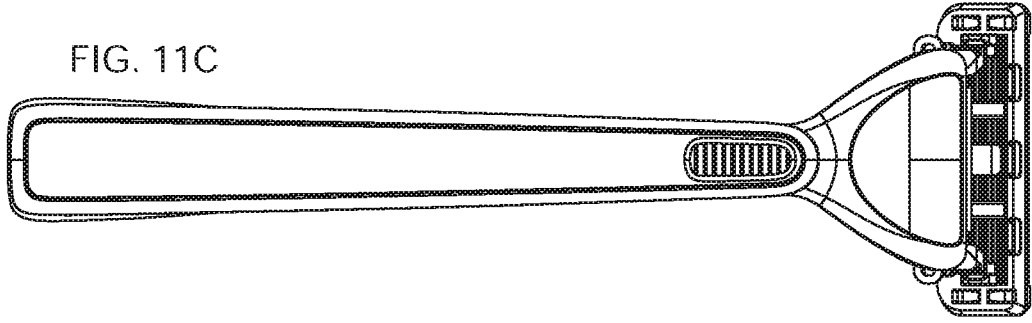

For example, the return element may have a different shape, for example the return element 16 is in the form of two separate fingers 42a, 42b, as shown in FIG. 9, or by a single, centrally disposed finger 44, as shown in FIG. 10. In this case, the fingers are configured to deform in the same manner described above and provide a similar restoring force. In these implementations, as well as in some implementations in which the return element is generally U-shaped, the back surface of blade unit 20 may include one or more features 46 which are positioned to act as a stop for the distal end of the return element 16. Support features 46 may enhance the ability of the return element 16 to bend or buckle in response to rotational forces.

Figure 13:
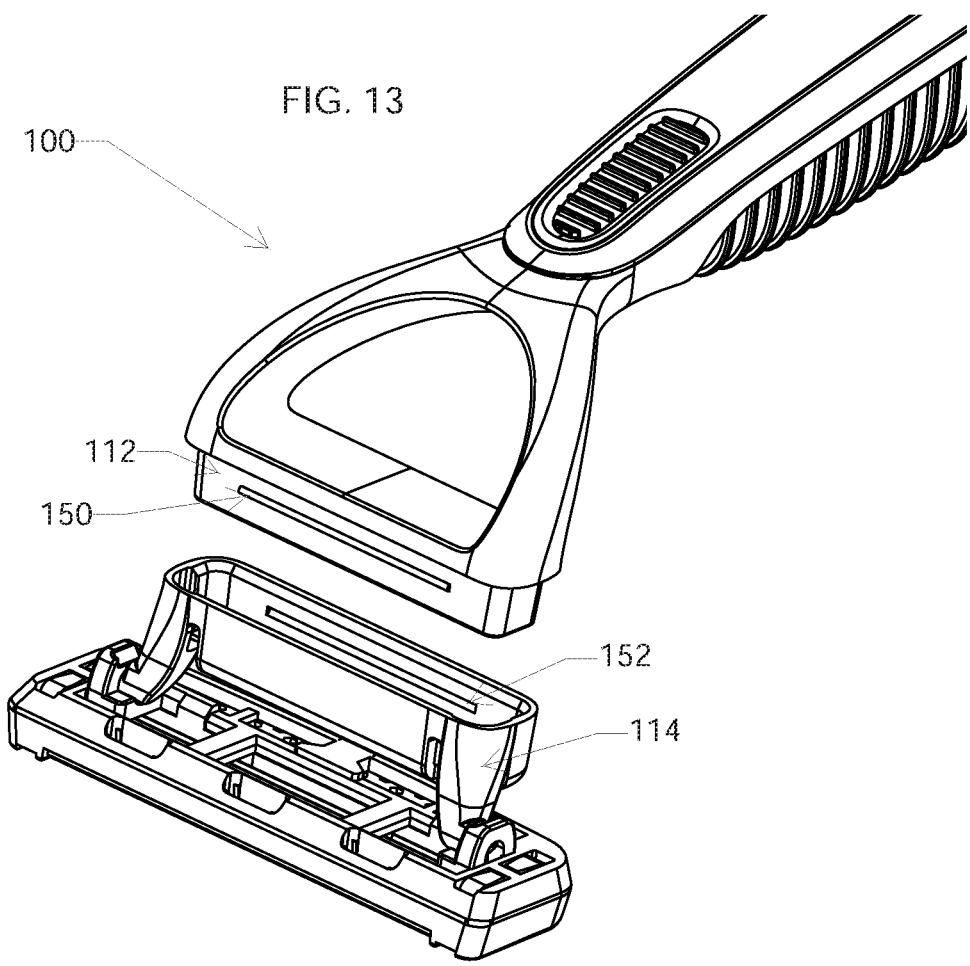
FIGS. 13-13A are perspective views of an embodiment in which the shaving assembly is designed to be permanently attached to the handle.
Figure 13A:
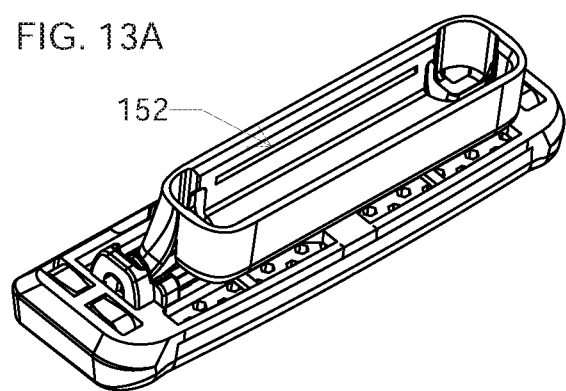

Also, while removable shaving assemblies have been discussed above, in some implementations the shaving system is designed to be disposable as a whole. In these cases, the shaving assembly is affixed to the handle in a manner that is not intended for the consumer to remove, e.g., by fixedly mounting the interface element on the distal end of the handle. This may be accomplished, for example, by engagement of corresponding mechanical locking features on the handle and interface element, by welding (e.g., ultrasonic welding), by molding the interface element integrally with the handle, or by any other desired mounting technique. An example of a disposable shaving system 100 is shown in FIG. 13, and the shaving assembly for such a system is shown in FIG. 13A. In this case, the handle 112 includes protrusions 150 (only one of which is shown, the other being on the opposite side of the handle), and the interface element includes corresponding locking indentations 152.

Figure 14:
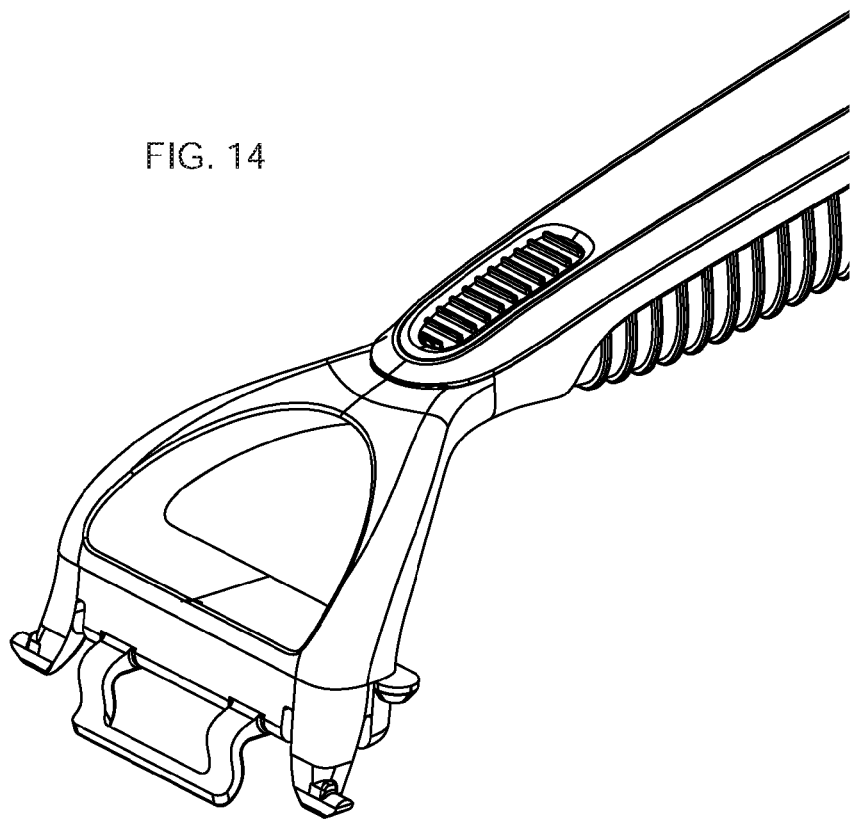
FIGS. 14-14A are perspective views of a handle and interface element showing an alternative geometry for the return element.
Figure 14A:
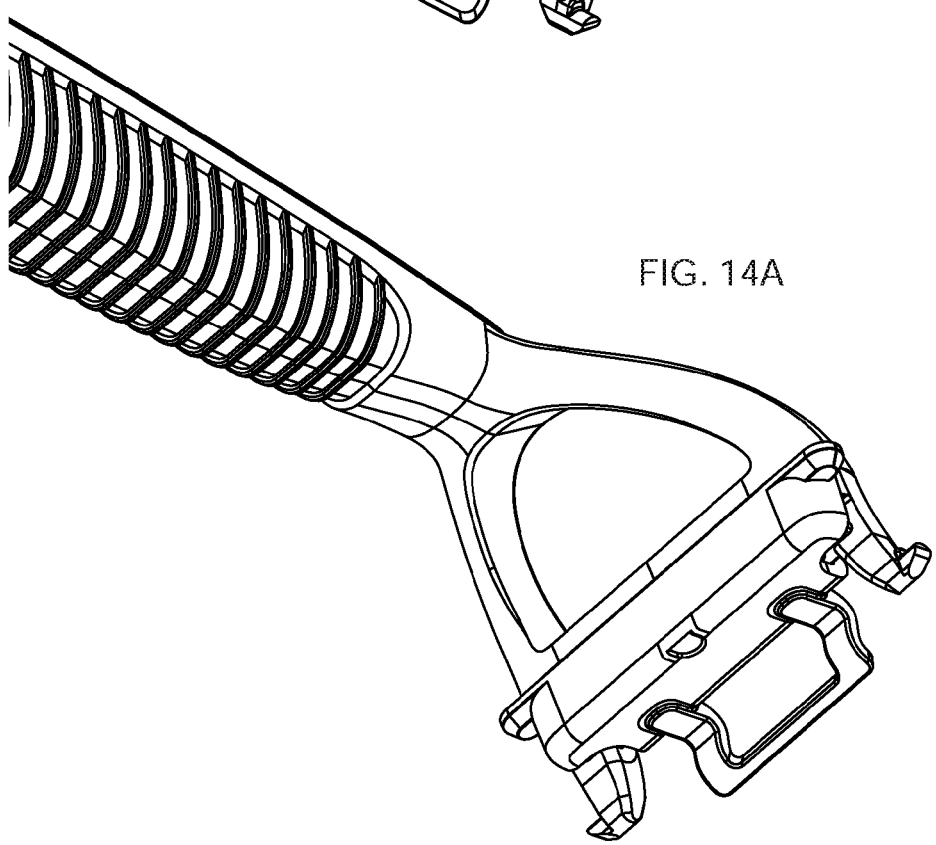

The return element may also have various shapes when seen from the side. For example, the side profile may define a single curve, as shown in FIGS. 7 and 7A, or a double-curved, "S" shape, as shown in FIGS. 14 and 14A. The latter shape may be used to move the return force further from the pivot point of the blade unit to better balance the blade unit during shaving.

Accordingly, other embodiments are within the scope of the following claims.

What is claimed is:

1. A method of shaving comprising:
contacting the skin with the blade unit of a shaving system, the shaving system comprising a handle having a distal end and a proximal end, and a replaceable shaving assembly that includes a blade unit and an interface element configured to removeably connect the blade unit to the handle, the interface element comprising an elastomeric return element configured to provide a return force between the blade unit and handle, one or more support features located on the blade unit, the support features both providing a stop for a distal end of the return element and increasing the ability of the return element to buckle upon rotation of the blade unit toward an upper surface of the handle, the one or more support features being in continuous contact with the distal end of the return element both while the blade unit is at rest, during use, and while the blade unit is fully angled during shaving.

2. A replaceable shaving assembly comprising:
a blade unit;
an interface element configured to removeably connect the blade unit to a handle, on which the blade unit is pivotably mounted, the interface element including an elastomeric return element configured to provide a return force between the blade unit and the handle; and
one or more support features located on the blade unit and providing a stop for a distal end of the return element, the one or more support features being in continuous contact with the distal end of the return element both while the blade unit is at rest, during use, and while the blade unit is fully angled during shaving;
wherein the support features increase the ability of the return element to buckle upon rotation of the blade unit toward an upper surface of the handle.

3. The shaving assembly of claim 2 wherein the return element is configured to bias the blade unit towards a rest position with respect to a pivot axis that is generally parallel to a long axis of the blade unit.

4. The shaving assembly of claim 2, wherein the return element comprises a thermoplastic elastomer or thermoplastic urethane.

5. The shaving assembly of claim 2 wherein the interface element comprises a substantially rigid portion defining a cavity configured to receive a distal end of the handle.

6. The shaving assembly of claim 5 wherein the return element is molded onto or attached to the substantially rigid portion of the interface element.

7. The shaving assembly of claim 2 wherein the interface element comprises pivot elements that are configured to be received by corresponding elements on the blade unit.

8. The shaving assembly of claim 2 wherein the stop is formed integrally with the blade unit.

9. A shaving system comprising:
a handle having a distal end and a proximal end; and
a shaving assembly, mounted on the distal end of the handle, the shaving assembly including
an interface element configured to connect a blade unit to the handle, and the blade unit is pivotably mounted on the interface element, the interface element including an elastomeric return element configured to provide a return force between the blade unit and the handle, and
one or more support features located on the blade unit and providing a stop for a distal end of the return element, the one or more support features being in continuous contact with the distal end of the return element both while the blade unit is at rest, during use, and while the blade unit is fully angled during shaving;
wherein the support features increase the ability of the return element to buckle upon rotation of the blade unit toward an upper surface of the handle.

10. The shaving system of claim 9 wherein the return element is configured to bias the blade unit towards a rest position with respect to a pivot axis that is generally parallel to a long axis of the blade unit.

11. The shaving system of claim 9, wherein the return element comprises a thermoplastic elastomer or thermoplastic urethane.

12. The shaving system of claim 9 wherein the interface element comprises a substantially rigid portion defining a cavity configured to receive a distal end of the handle.

13. The shaving system of claim 12 wherein the return element is molded onto or attached to the substantially rigid portion of the interface element.

14. The shaving system of claim 9 wherein the return element is configured to deflect and then bend or buckle upon rotation of the blade unit toward an upper surface of the handle.

15. The shaving system of claim 9 wherein the interface element comprises pivot elements that are configured to be received by corresponding elements on the blade unit.

16. The shaving system of claim 9 wherein the stop is formed integrally with the blade unit.

17. The shaving system of claim 9 wherein the interface element is configured to be removably mounted on the handle, allowing replacement of the shaving assembly.

18. The shaving system of claim 9 wherein the interface element is fixedly mounted on the handle.

19. The shaving system of claim 18 wherein the interface element is attached to the handle by mechanical engagement or welding.

20. The shaving system of claim 18 wherein the interface element is molded integrally with the handle.

* * * * *